United States Patent
Ebrahimi Afrouzi

(10) Patent No.: US 11,144,056 B1
(45) Date of Patent: Oct. 12, 2021

(54) AUTONOMOUS REFUSE CONTAINER REPLACEMENT SYSTEM

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 264 days.

(21) Appl. No.: 16/245,998

(22) Filed: Jan. 11, 2019

Related U.S. Application Data

(60) Provisional application No. 62/616,669, filed on Jan. 12, 2018.

(51) Int. Cl.
| | | |
|---|---|---|
| *B65F 3/00* | (2006.01) | |
| *G05D 1/00* | (2006.01) | |
| *G08G 1/00* | (2006.01) | |
| *G05D 1/02* | (2020.01) | |

(52) U.S. Cl.
CPC ............ *G05D 1/0088* (2013.01); *B65F 3/00* (2013.01); *G05D 1/0027* (2013.01); *G05D 1/0225* (2013.01); *G08G 1/205* (2013.01); *B65F 2210/128* (2013.01); *B65F 2210/182* (2013.01)

(58) Field of Classification Search
CPC ........ G05D 1/0088; G05D 1/0027; B65F 3/00
See application file for complete search history.

(56) References Cited

U.S. PATENT DOCUMENTS

| | | | |
|---|---|---|---|
| 4,537,420 A | 8/1985 | Ito et al. | |
| 5,565,846 A | 10/1996 | Geiszler et al. | |
| 5,697,633 A | 12/1997 | Lee | |
| 5,924,712 A | 7/1999 | Pierce | |
| 5,995,884 A | 11/1999 | Allen et al. | |
| 6,535,793 B2 | 3/2003 | Allard | |
| 6,667,592 B2 | 12/2003 | Jacobs et al. | |
| 6,845,297 B2 | 1/2005 | Allard | |
| 7,568,536 B2 | 8/2009 | Yu et al. | |
| 7,813,835 B2 | 10/2010 | Fujita et al. | |
| 8,355,828 B2 | 1/2013 | Tolia et al. | |
| 8,380,349 B1 | 2/2013 | Hickman et al. | |

(Continued)

FOREIGN PATENT DOCUMENTS

| | | |
|---|---|---|
| CN | 104944029 B | 6/2017 |
| JP | 4556024 B2 | 10/2010 |

*Primary Examiner* — Jess Whittington

(57) ABSTRACT

Included is a method for autonomous robotic refuse container replacement including: transmitting, by a processor of a first robotic refuse container, a request for replacement to a portion of processors of robotic refuse containers; receiving, by the processor of the first robotic refuse container, a return signal from a portion of processors of the robotic refuse containers; transmitting, by the processor of the first robotic refuse container, a confirmation for replacement to a processor of a second robotic refuse container in response to a return signal received from the processor of the second robotic refuse container; instructing, by the processor of the first robotic refuse container, the first robotic refuse container to navigate to a second location from a current location; and instructing, by the processor of the second robotic refuse container, the second robotic refuse container to navigate to the current location of the first robotic refuse container.

12 Claims, 3 Drawing Sheets

(56) References Cited

U.S. PATENT DOCUMENTS

| | | | | |
|---|---|---|---|---|
| 8,458,715 | B1 * | 6/2013 | Khosla | G06Q 10/06 |
| | | | | 718/104 |
| 9,168,786 | B2 | 10/2015 | Schlee et al. | |
| 9,283,674 | B2 | 3/2016 | Hoffman et al. | |
| 9,298,183 | B2 | 3/2016 | Artes et al. | |
| 9,486,924 | B2 | 11/2016 | Dubrovsky et al. | |
| 9,821,455 | B1 * | 11/2017 | Bareddy | B25J 9/1682 |
| 10,596,695 | B1 * | 3/2020 | Bareddy | H04N 7/142 |
| 10,678,254 | B1 * | 6/2020 | Jonas | A47L 9/0477 |
| 2009/0248200 | A1 | 10/2009 | Root | |
| 2017/0123418 | A1 * | 5/2017 | Erickson | G08G 5/0043 |
| 2017/0285642 | A1 * | 10/2017 | Rander | G05D 23/1905 |
| 2017/0293301 | A1 * | 10/2017 | Myslinski | G06Q 30/0202 |
| 2018/0164828 | A1 * | 6/2018 | Dumitras | B25J 9/1676 |
| 2018/0307779 | A1 * | 10/2018 | Tellex | G06F 40/42 |
| 2019/0047698 | A1 * | 2/2019 | Jassowski | G05D 1/104 |
| 2019/0092183 | A1 * | 3/2019 | Sussman | B60L 58/13 |

* cited by examiner

US 11,144,056 B1

AUTONOMOUS REFUSE CONTAINER REPLACEMENT SYSTEM

CROSS-REFERENCE TO RELATED APPLICATIONS

This application claims the benefit of Provisional Patent Application No. 62/616,669, filed Jan. 12, 2018, hereby incorporated by reference.

In this patent, certain U.S. patents, U.S. patent applications, or other materials (e.g., articles) have been incorporated by reference. Specifically, U.S. application Ser. Nos. 15/272,752, 15/949,708, 16/048,179, 16/048,185, 16/163,541, 16/163,562, 16/163,508, 16/185,000, 62/681,965, 62/614,449, 16/109,617, 16/051,328, 15/449,660, 16/041,286, 15/406,890, 14/673,633, 16/163,530, 62/746,688, 62/740,573, 62/740,580, 15/955,480, 15/425,130, 15/955,344, 15/048,827, 14/817,952, 16/198,393, 15/981,643, 15/986,670, 62/664,389, 15/447,450, 15/447,623, 62/665,942, 62/617,589, 62/620,352, 15/951,096, 16/130,880, 14/948,620, 16/239,410, 14/859,748, 16/230,805, and 16/129,757, are hereby incorporated by reference. The text of such U.S. Patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to mobile robotic devices and more particularly to mobile robotic refuse containers.

BACKGROUND

Autonomous robotic devices are becoming increasingly common in consumer homes and commercial spaces. In several instances, autonomous robotic devices are desirable for the convenience they provide to a user. For example, autonomous mobile robotic devices may be used for cleaning homes, waste management, industrial tasks and the like. As the technology progresses, autonomous robotic devices may be implemented on a larger scale. For example, a network of robotic devices may be implemented within an environment to collaboratively execute tasks.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a method for managing autonomous robotic refuse container replacement of at least two robotic refuse containers including: transmitting, by a processor of a first robotic refuse container, a request for replacement to at least a portion of processors of each of the at least two robotic refuse containers; receiving, by the processor of the first robotic refuse container, a return signal from at least a portion of processors of each of the at least two robotic refuse containers that received the request for replacement; transmitting, by the processor of the first robotic refuse container, a confirmation for replacement to a processor of a second robotic refuse container in response to a return signal received from the processor of the second robotic refuse container from among all the return signals received; instructing, by the processor of the first robotic refuse container, the first robotic refuse container to navigate to a second location from a current location; and instructing, by the processor of the second robotic refuse container, the second robotic refuse container to navigate to the current location of the first robotic refuse container.

Some aspects include a method for a control system to manage autonomous robotic refuse container replacement of at least two robotic refuse containers including: receiving, by the control system, a request for replacement from a processor of a first robotic refuse container; transmitting, by the control system, instructions to a processor of a second robotic refuse container to navigate to a current location of the first robotic refuse container; and transmitting, by the control system, instructions to the processor of the first robotic refuse container to navigate to a second location.

DETAILED DESCRIPTION OF SOME EMBODIMENTS

Figure 1:
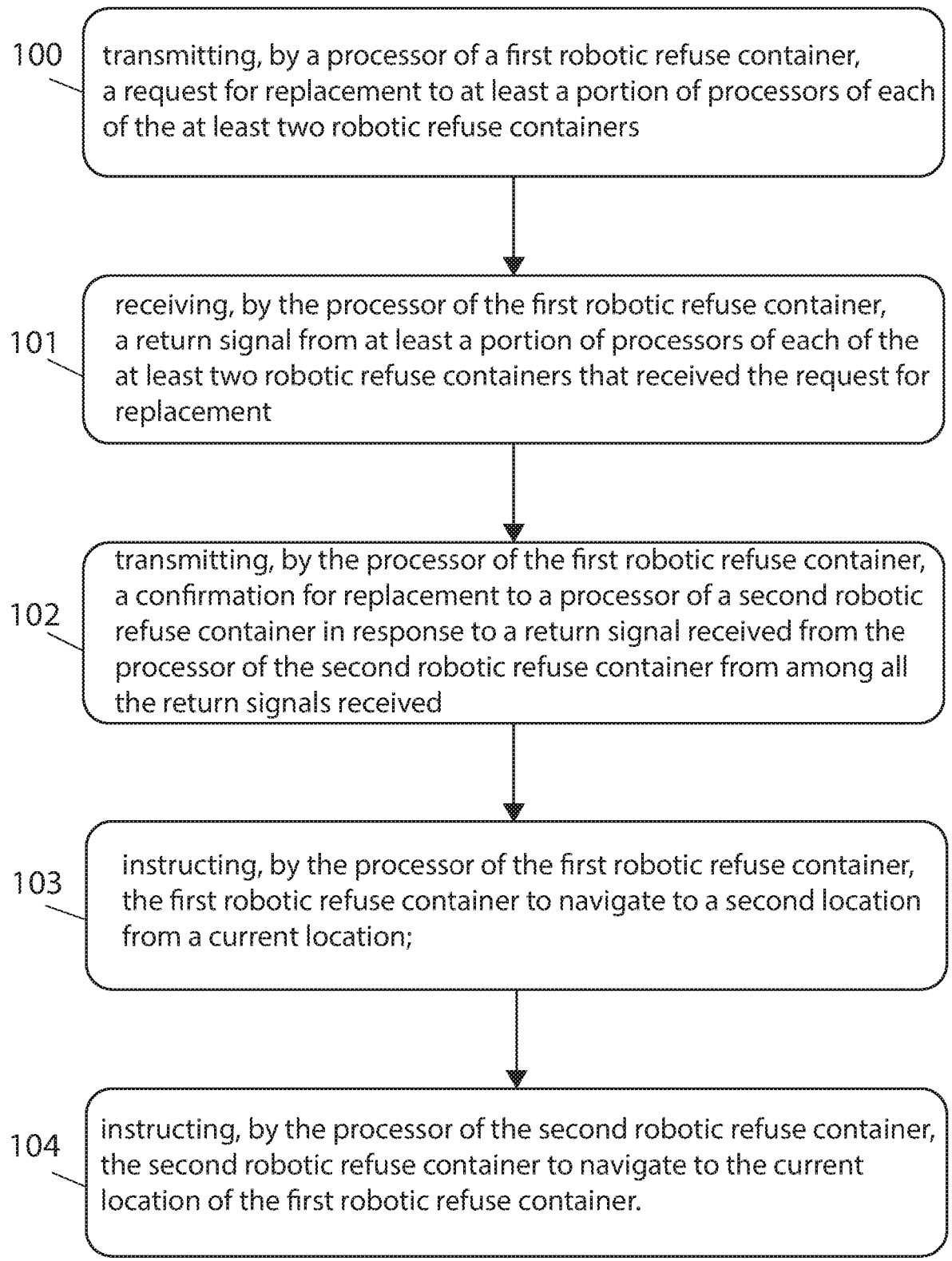
FIG. 1 illustrates a flow chart describing a method for autonomous refuse container replacement according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include an autonomous robotic refuse container replacement system for at least two robotic refuse containers including: transmitting, by a processor of a first robotic refuse container, a request for replacement to at least a portion of processors of each of the at least two robotic refuse containers; receiving, by the processor of the first robotic refuse container, a return signal from at least a portion of processors of each of the at least two robotic refuse containers that received the request for replacement; transmitting, by the processor of the first robotic refuse container, a confirmation for replacement to a processor of a second robotic refuse container in response to the return signal received from the processor of the second robotic refuse container; instructing, by the processor of the first robotic refuse container, the first robotic refuse container to navigate to a second location from a current location; and instructing, by the processor of the second robotic refuse container, the second robotic refuse container to navigate to the current location of the first robotic refuse container. In some embodiments, the first robotic refuse container requests replacement because a battery of the first robotic refuse container requires recharging, the refuse container is close to being full or is full, or the first robotic refuse container is malfunctioning. In some embodiments, the processors of each of the at least two robotic refuse containers that receive the request for replacement are currently empty, unused, and charged. In some embodiments, the processors of each of the at least two robotic refuse containers that receive the request for replacement have a fill volume below a predetermined threshold, are charged to a level above a predetermined threshold, and are unused. In some embodiments, the processors of each of the at least two robotic refuse containers that transmit the return signal in response to a request for replacement are currently empty, unused, and charged. In some embodiments, the processors of each of the at least two robotic refuse containers that transmit the return signal in response to a request for replacement have a refuse fill volume below a predetermined threshold, are charged to a level above a predetermined threshold, and are unused. In some embodiments, the processor of the second robotic refuse container that receives the confirmation for replacement is the nearest, unused, and charged robotic refuse container. In some embodiments, the processor of the first robotic refuse container determines which processor to transmit the confirmation signal to based on location, fill volume and battery charge of each of the robotic refuse containers from which the return signal was received and the current location of the first robotic refuse container, wherein different factors can have different weight depending on importance. In some embodiments, the processor of the first robotic refuse container transmits the request for replacement to processors of the at least two robotic refuse containers that are located within a first predetermined distance from the first robotic refuse container, have a refuse fill volume below a predetermined threshold, have a battery level above a predetermined threshold, and are unused. In some embodiments, the processor of the first robotic device increases the first predetermined distance to a second predetermined distance when there are no unused robotic refuse containers with a refuse fill volume below a predetermined threshold and a battery level above a predetermined threshold within the first predetermined distance. In some embodiments, the second location of the first robotic refuse container is the nearest charging station, the nearest refuse collection site, the nearest parking area, a designated charging station, a designated refuse collection site, or a designated parking area.

In some embodiments, the processor of the at least two robotic refuse containers communicate and collaborate with one another using collaborative methods for robotic devices, such as those described in U.S. patent application Ser. Nos. 15/981,643, 15/986,670, 16/185,000, 15/048,827 and 14/948,620, the entire contents of which are hereby incorporated by reference. In some embodiments, the processors of the at least two robotic refuse containers share intelligence and collaborate to determine which robotic refuse container of each of the robotic refuse containers from which the return signal was received should replace the first robotic refuse container that transmitted the request for replacement. In some embodiments, the processors of the at least two robotic refuse containers share intelligence and the processor of the first robotic refuse container determines which robotic refuse container of each of the robotic refuse containers from which the return signal was received should replace it based on the intelligence shared between the at least two robotic refuse containers, including location of robotic refuse containers (e.g., to determine nearest robotic refuse container), fill volume of robotic refuse containers, battery charge of robotic refuse containers, etc. In some embodiments, the processor of the first robotic refuse container determines which robotic refuse container of each of the robotic refuse containers from which the return signal was received should replace it using a Markov Decision Process (MDP), wherein the action or actions that provide the greatest overall reward for the at least two robotic refuse containers are chosen. Examples describing the implementation of a MDP for collaborating robotic devices are provided in U.S. patent application Ser. Nos. 15/981,643, 16/185,000, 16/230,805, 14/817,952, and 16/198,393 the entire contents of which are hereby incorporated by reference.

In some embodiments, a control system manages the autonomous robotic refuse container system. An example of a control system for managing robotic devices is described in U.S. patent application Ser. No. 16/130,880, the entire contents of which is hereby incorporated by reference. In some embodiments, the at least two robotic refuse containers are paired with the control system using a pairing method such as that described in U.S. patent application Ser. No. 16/109,617, the entire contents of which is hereby incorporated by reference. In some embodiments, the control system includes, a centralized server, a specialized computing device, an application (mobile or web for example) accessible from a communication device such as a mobile phone, tablet, laptop, etc., or another type of device. In some embodiments, the control system is autonomous, semi-autonomous, or manually operated. In some embodiments, the at least two robotic refuse containers communicate information with the control system, such as, a current volume of refuse, a maximum volume of refuse, a battery level, a current location, etc. and the control system instructs the at least two robotic refuse containers based on the information from the at least two robotic refuse containers communicated with the control system. In some embodiments, the control system receives a request for replacement from a processor of a first robotic refuse container. In some embodiments, the control system transmits instructions to a processor of a second robotic refuse container to navigate to a current location of the first robotic refuse container and instructions to the processor of the first robotic refuse container to navigate to a particular location. In some embodiments, the processor of the first robotic refuse container transmits the request for replacement because its refuse container is close to or is full, its battery level is low, or it is malfunctioning. In some embodiments, the control system determines the second robotic refuse container to replace the first robotic refuse container based on location of robotic refuse containers (e.g., to determine nearest robotic refuse container), fill volume of robotic refuse containers, battery charge of robotic refuse containers, etc. In some embodiments, the control system transmits information including the location of the first robotic refuse container and the route to navigate to the location of the first robotic refuse container to the processor of the second robotic refuse container. In some embodiments, the control system transmits information including the closest location to recharge a battery, the closest refuse collection location, and a navigational route to the processor of the first robotic refuse container.

In some embodiments, additional factors are used in determining the second robotic refuse container to replace the first robotic refuse container, including an activity level surrounding each of the at least two robotic refuse containers, a number of operation hours of each of the at least two robotic refuse containers, a condition of each of the at least two robotic refuse containers, a status of each of the at least two robotic refuse containers, a number of maintenance hours of each of the at least two robotic refuse containers, a time required for replacement of the first robotic refuse container, environmental conditions (e.g., traffic conditions, weather conditions, etc.), historical success in completing actions for each of the at least two robotic refuse containers, actions executed by each of the at least two robotic refuse containers, upcoming actions of each of the at least two robotic refuse containers, sensor data collected by each of the at least two robotic refuse containers, etc.

In embodiments, a graphical user interface of an application of a communication device is used to communicate with one or more robotic refuse containers or a control system of one or more robotic refuse containers. An example of a communication device includes, a mobile phone, a laptop, a tablet, a desktop computer, a remote control, and the like. An example of a graphical user interface is described in U.S. patent application Ser. Nos. 15/272,752 and 15/949,708, the entire contents of which are hereby incorporated by reference. In some embodiments, the application of the communication device is paired with one or more robotic refuse containers or a control system of one or more robotic refuse containers using pairing methods such as those described in U.S. patent application Ser. No. 16/109,617, the entire contents of which is hereby incorporated by reference. Information communicated between the application of the communication device and the one or more robotic refuse containers or the control system of one or more robotic refuse containers can include, but is not limited to, request for replacement of a particular robotic refuse container, fill level of a particular robotic refuse container, battery level of a particular robotic refuse container, request of a robotic refuse container at a particular location, etc. In some embodiments, a user communicates with the control system in real time using the application of the communication device, and the control system provides instructions to the one or more robotic refuse containers (as described above) based on the information communicated from the application. In some embodiments, the control system determines which robotic refuse container to transmit instructions to depending on, for example, the location, availability, battery level, etc. of the one or more robotic refuse containers and the instruction requested by the user.

In some embodiments, a processor of each robotic refuse container determines decisions, processes, execution of tasks individually based on, for example, internal and/or external observations, information received from the control system and/or other robotic devices, historical information, etc. In some embodiments, the processor of each robotic refuse container uses machine learning techniques to independently determine optimal actions to execute. Examples of learning techniques that can be applied are described in U.S. patent application Ser. Nos. 16/230,805, 14/859,748, 16/239,410, 16/041,286, and 16/198,393, the entire contents of which are hereby incorporated by reference. In some embodiments, the control system determines decisions, processes, execution of tasks for individual robotic refuse containers to which it is connected to.

In some embodiments, the processors of the at least two robotic refuse containers collaborate to or individually generate a map of the environment or individually generate. In some embodiments, a map of the environment is preloaded into a memory of each of the at least two robotic refuse containers. In some embodiments, the processors of the at least two robotic refuse containers generate a new map of the environment during each working session and combine it with previously generated maps to improve the accuracy of a complete map of the environment. In some embodiments, the processors of the at least two robotic refuse containers transmit one or more maps to a control system, such as the control system described above. In some embodiments, the control system updates a complete map of the environment with the maps received from the processors of the at least two robotic refuse containers. In some embodiments, the processors of the at least two robotic refuse containers transmit observations of the environment collected during working sessions. In some embodiments, the control system generates and updates a map of the environment using the observations received from the processors of the at least two robotic refuse containers. Examples of mapping methods are described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference.

In some embodiments, each of the at least two robotic refuse containers autonomously park in a designated parking area when unused. An example of a method for autonomous parking of robotic devices is described in U.S. patent application Ser. No. 16/230,805, the entire contents of which is hereby incorporated by reference. In some embodiments, the at least two robotic refusers containers are operated using the autonomous vehicle system and methods described in U.S. patent application Ser. No. 16/230,805, the entire contents of which are hereby incorporated by reference. In some embodiments, each of the at least two robotic refuse containers or a control system managing the at least two robotic refuse containers autonomously adjust their operational settings or choose their actions based on environmental characteristics observed using methods such as those described in U.S. patent application Ser. Nos. 16/239,410 and 16/163,530, the entire contents of which are hereby incorporated by reference.

In embodiments, all or a portion of information transmitted by the processors of the at least two robotic refuse containers or a control system managing the robotic refuse containers is stored in a centralized memory that can be accessed by the processors of the at least two robotic refuse containers or the control system managing the robotic refuse containers. In some embodiments, information transmitted from the application of the communication device is stored in a centralized memory that can be accessed by the processors of the at least two robotic refuse containers or the control system managing the robotic refuse containers. In some embodiments, the information transmitted and received between the control system, the at least two robotic refuse containers, and the application of the communication device include several different types of information, such as scheduling information, mapping information, navigation information, task information, status information, internal or external observations, and other types of information that are useful to the control system, the at least two robotic devices, and a user of the application of the communication device.

In some embodiments, information is transmitted between devices (e.g., control system, robotic refuse container, communication device, etc.) using a wireless communication channel such as Wi-Fi or Bluetooth.

In some embodiments, a schedule for replacement for each or a portion of the at least two robotic refuse containers is determined by the processors of each or the portion of the at least two robotic refuse containers or a control system managing the at least two robotic refuse containers. In some embodiments, a schedule of a robotic refuse container includes a day and time for replacement, a particular robotic refuse container that will replace the robotic refuse container, a navigational route to a particular location after replacement, etc. In some embodiments, the schedule of the robotic refuse container includes day and time for replacement and the particular robotic refuse container that will replace the robotic refuse container, the navigational route to a particular location after replacement, etc. are determined in real-time at the time of replacement. In some embodiments, the schedule of each or the portion of robotic refuse containers is determined based on an activity level surrounding each of the at least two robotic refuse containers, a number of operation hours of each of the at least two robotic refuse containers, a condition of each of the at least two robotic refuse containers, a status of each of the at least two robotic refuse containers, a number of maintenance hours of each of the at least two robotic refuse containers, environmental conditions (e.g., traffic conditions, weather conditions, etc.), etc. Examples of methods for setting a schedule are described in U.S. patent application Ser. Nos. 16/051,328 and 15/449,660, the entire contents of which are hereby incorporated by reference.

In some embodiments, each of the at least two robotic refuse containers include, but are not limited to, a chassis, a set of wheels (if mobile for example), a suspension system, a rechargeable battery, an actuator, a control module, a processor, and a refuse container coupled to the chassis. An example of an autonomous refuse container is described in U.S. patent application Ser. No. 16/129,757, the entire contents of which is hereby incorporated by reference. In some embodiments, the chassis is a versatile mobile robotic chassis customized to function as a robotic refuse container. An example of a customizable versatile mobile robotic chassis is described in U.S. patent application Ser. No. 16/230,805, the entire contents of which is hereby incorporated by reference. Examples of wheels of a robotic device are described in U.S. Patent Application No. 62/664,389, 15/447,450, 15/447,623, and 62/665,942, the entire contents of which are hereby incorporated by reference. Examples of a suspension system are described in U.S. Patent Application Ser. Nos. 62/617,589, 62/620,352, and 15/951,096, the entire contents of which are hereby incorporated by reference. In some embodiments, each of the at least two robotic refuse containers further include a user interface for, for example, adjusting settings, choosing functions, and scheduling tasks. In some embodiments, each of the at least two robotic refuse containers further include a mapping module for mapping the environment using mapping methods such as those described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. In some embodiments, each of the at least two robotic refuse containers further include a localization module that implement localization methods such as those described in U.S. Patent Application Ser. Nos. 62/746,688, 62/740,573, 62/740,580, 15/955,480, 15/425,130, and 15/955,344 the entire contents of which are hereby incorporated by reference. In some embodiments, each of the at least two robotic refuse containers further include a path planning module to determine optimal movement paths based on the actions to be executed using path planning methods such as those described in U.S. patent application Ser. Nos. 16/041,286, 15/406,890, and 14/673,633, the entire contents of which are hereby incorporated by reference. In some embodiments, each of the at least two robotic refuse containers include a scheduling module for setting a schedule using scheduling methods such as those described in U.S. patent application Ser. Nos. 16/051,328 and 15/449,660, the entire contents of which are hereby incorporated by reference. In some embodiments, each of the at least two robotic refuse containers include sensors such as battery level sensors, weight sensors, refuse volume sensors, cameras, LIDAR sensors, LADAR sensors, stereo imaging sensors, optical sensors, imaging sensors, distance sensors, acoustic sensors, motion sensors, obstacle sensors, cliff sensors, floor sensors, debris sensors, time-of-flight sensors, depth sensors, signal transmitters and receivers, signal strength sensor, gyroscope, optical encoders, optical flow sensors, GPS sensors, and other types of sensors. In some embodiments, each of the at least two robotic refuse containers include a wireless module to wirelessly send and receive information, such as a Wi-Fi module or a Bluetooth module.

FIG. 1 illustrates a flow chart including steps 100, 101, 102, 103, and 104 that describe some embodiments of a method for managing autonomous refuse container replacement of at least two robotic refuse containers described herein.

Figure 2:
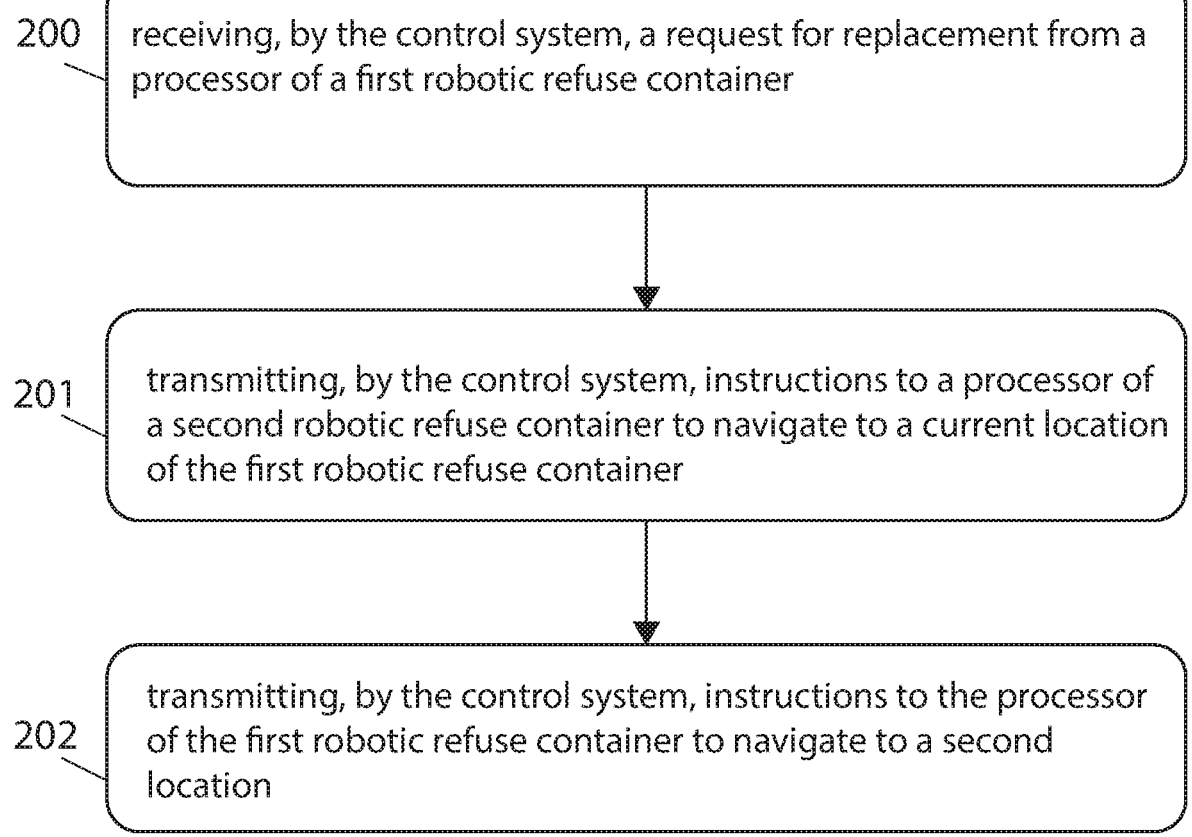
FIG. 2 illustrates a flow chart describing a method for autonomous refuse container replacement according to some embodiments.

FIG. 2 illustrates a flow chart including steps 200, 201, and 202 that describe some embodiments of a method for a control system to manage autonomous refuse container replacement of at least two robotic refuse containers described herein.

Figure 3:
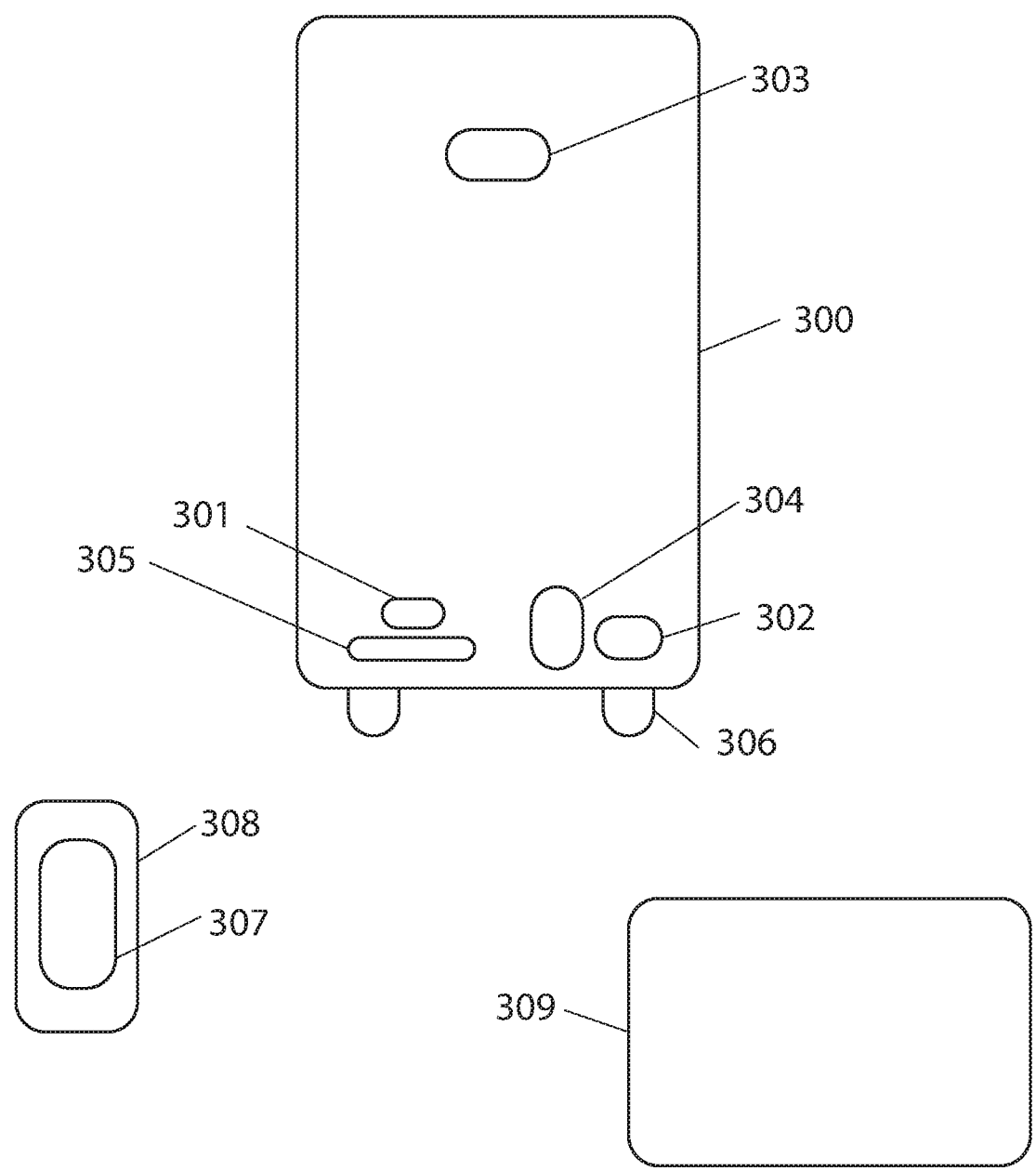
FIG. 3 illustrates an example of a robotic refuse container, an application of a communication device, and a control system according to some embodiments.

FIG. 3 illustrates a front view of an example of a robotic refuse container 300 with a processor 301, memory 302, sensors 303, actuator 304, battery 305 and wheels 306. In some embodiments, the robotic refuse container 300 may include the features of a robotic refuse container described herein. In some embodiments, program code stored in the memory 302 and executed by the processor 301 may effectuate the operations described herein. Some embodiments additionally include communication device 307 (e.g., mobile device, laptop, remote control, specialized computer, desktop computer, tablet, etc.) having a touchscreen 308 and that executes an application by which a user or operator interfaces with robotic refuse container 300. In some embodiments, processor 301 and memory 302 implement some of the functionality described herein. In some embodiments, the user or operator may provide instructions to robotic refuse container 300 to perform certain tasks or to use certain settings at certain times or in certain areas of the environment using the application of communication device 307 wirelessly paired with robotic refuse container 300 or control system 309 managing robotic refuse container 300.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A method for managing autonomous robotic refuse container replacement of at least two robotic refuse containers comprising: transmitting, by a processor of a first robotic refuse container, a request for replacement to at least a portion of processors of each of the at least two robotic refuse containers; receiving, by the processor of the first robotic refuse container, a return signal from at least a portion of processors of each of the at least two robotic refuse containers that received the request for replacement; transmitting, by the processor of the first robotic refuse container, a confirmation for replacement to a processor of a second robotic refuse container in response to a return signal received from the processor of the second robotic refuse container from among all the return signals received; instructing, by the processor of the first robotic refuse container, the first robotic refuse container to navigate to a second location from a current location; and instructing, by the processor of the second robotic refuse container, the second robotic refuse container to navigate to the current location of the first robotic refuse container.

2. The method of embodiment 1, wherein the processor of the first robotic refuse container requests replacement because a battery level of the first robotic refuse container is below predetermined threshold, a refuse container fill volume of a refuse container of the first robotic refuse container requires is greater than a predetermined threshold, or the first robotic refuse container is malfunctioning.

3. The method of embodiments 1-2, wherein the portion of processors of each of the at least two robotic refuse containers that receive the request for replacement each have a battery level below a predetermined threshold, a refuse container fill volume less than a predetermined threshold, are located within a first predetermined distance from the first robotic refuse container and are unused.

4. The method of embodiment 3, wherein the processor of the first robotic refuse container increases the first predetermined distance to a second predetermined distance when the processor of the first robotic refuse container does not receive any return signals.

5. The method of embodiments 1-4, wherein the portion of processors of each of the at least two robotic refuse containers that receive the request for replacement are within a first predetermined distance from the first robotic refuse container.

6. The method of embodiment 5, wherein the portion of processors of each of the at least two robotic refuse containers that transmit the return signal each have a battery level below a predetermined threshold, a refuse container fill volume less than a predetermined threshold, are located within a first predetermined distance from the first robotic refuse container and are unused.

7. The method of embodiment 5, wherein the processor of the first robotic refuse container increases the first predetermined distance to a second predetermined distance when the processor of the first robotic refuse container does not receive any return signals.

8. The method of embodiments 1-7, wherein the second robotic refuse container is the nearest unused robotic refuse container with a battery level below a predetermined threshold and a refuse container fill volume less than a predetermined threshold.

9. The method of embodiments 1-8, wherein the second location of the first robotic refuse container is a nearest charging station, a nearest refuse collection site, a nearest parking area, a designated charging station, a designated refuse collection site, or a designated parking area.

10. The method of embodiments 1-9, wherein at least a portion of processors of each of the at least two robotic refuse containers transmit and receive information to and from each other.

11. The method of embodiment 10, wherein the information comprises at least one of: a current location, a current refuse container fill volume, a battery level, a surrounding activity level, a number of operation hours, a robotic refuse container condition, a status, a number of maintenance hours, a time required to reach a replacement location, environmental conditions, historical success in completing actions, actions executed, upcoming actions, and sensor data.

12. The method of embodiments 1-11, wherein the processor of the first robotic refuse container determines the second robotic refuse container to replace the first robotic refuse container using a Markov Decision Process.

13. A method for a control system to manage autonomous robotic refuse container replacement of at least two robotic refuse containers comprising: receiving, by the control system, a request for replacement from a processor of a first robotic refuse container; transmitting, by the control system, instructions to a processor of a second robotic refuse container to navigate to a current location of the first robotic refuse container; and transmitting, by the control system, instructions to the processor of the first robotic refuse container to navigate to a second location.

14. The method of embodiment 13, wherein the processor of the first robotic refuse container requests replacement because a battery level of the first robotic refuse container is below predetermined threshold, a refuse container fill volume of a refuse container of the first robotic refuse container requires is greater than a predetermined threshold, or the first robotic refuse container is malfunctioning.

15. The method of embodiments 13-14, wherein the second robotic refuse container has a battery level below a predetermined threshold, a refuse container fill volume less than a predetermined threshold, is located within a first predetermined distance from the first robotic refuse container and is unused.

16. The method of embodiment 15, wherein the control system increases the first predetermined distance to a second predetermined distance when there are no unused robotic refuse containers with a battery level below a predetermined threshold and a refuse container fill volume less than a predetermined threshold located within the first predetermined distance.

17. The method of embodiments 13-16, wherein the second robotic refuse container is the nearest unused robotic refuse container with a battery level below a predetermined threshold and a refuse container fill volume less than a predetermined threshold.

18. The method of embodiments 13-17, wherein the second location of the first robotic refuse container is a nearest charging station, a nearest refuse collection site, a nearest parking area, a designated charging station, a designated refuse collection site, or a designated parking area.

19. The method of embodiments 13-18, wherein at least a portion of processors of each of the at least two robotic refuse containers transmit and receive information to and from the control system and wherein the information comprises at least one of: a current location, a current refuse container fill volume, a battery level, a surrounding activity level, a number of operation hours, a robotic refuse container condition, a status, a number of maintenance hours, a time required to reach a replacement location, environmental conditions, historical success in completing actions, actions executed, upcoming actions, and sensor data.

20. The method of embodiments 13-19, wherein the control system determines the second robotic refuse container to replace the first robotic refuse container using a Markov Decision Process.

The invention claimed is:

1. A method for managing autonomous robotic refuse container replacement of at least two robotic refuse containers comprising:
   transmitting, by a processor of a first robotic refuse container, a request for replacement to at least a portion of processors of each of the at least two robotic refuse containers;
   receiving, by the processor of the first robotic refuse container, a return signal from at least a portion of processors of each of the at least two robotic refuse containers that received the request for replacement;
   transmitting, by the processor of the first robotic refuse container, a confirmation for replacement to a processor of a second robotic refuse container in response to a return signal received from the processor of the second robotic refuse container from among all the return signals received;
   instructing, by the processor of the first robotic refuse container, the first robotic refuse container to navigate to a second location from a current location; and
   instructing, by the processor of the second robotic refuse container, the second robotic refuse container to navigate to the current location of the first robotic refuse container,
   wherein:
   the portion of processors of each of the at least two robotic refuse containers that receive the request for replacement are within a first predetermined distance from the first robotic refuse container; and
   the processor of the first robotic refuse container increases the first predetermined distance to a second predetermined distance when the processor of the first robotic refuse container does not receive any return signals.

2. The method of claim 1, wherein the processor of the first robotic refuse container requests replacement because a battery level of the first robotic refuse container is below predetermined threshold, a refuse container fill volume of a refuse container of the first robotic refuse container requires is greater than a predetermined threshold, or the first robotic refuse container is malfunctioning.

3. The method of claim 1, wherein the portion of processors of each of the at least two robotic refuse containers that receive the request for replacement each have a battery level above a predetermined threshold, a refuse container fill volume less than a predetermined threshold, and are unused.

4. The method of claim 1, wherein the portion of processors of each of the at least two robotic refuse containers that transmit the return signal each have a battery level above a predetermined threshold, a refuse container fill volume less than a predetermined threshold, are located within the first predetermined distance from the first robotic refuse container and are unused.

5. The method of claim 1, wherein the second robotic refuse container is the nearest unused robotic refuse container with a battery level above a predetermined threshold and a refuse container fill volume less than a predetermined threshold.

6. The method of claim 1, wherein the second location of the first robotic refuse container is a nearest charging station, a nearest refuse collection site, a nearest parking area, a designated charging station, a designated refuse collection site, or a designated parking area.

7. The method of claim 1, wherein at least a portion of processors of each of the at least two robotic refuse containers transmit and receive information to and from each other.

8. The method of claim 7, wherein the information comprises at least one of: a current location, a current refuse container fill volume, a battery level, a surrounding activity level, a number of operation hours, a robotic refuse container condition, a status, a number of maintenance hours, a time required to reach a replacement location, environmental conditions, historical success in completing actions, actions executed, upcoming actions, and sensor data.

9. The method of claim 1, wherein the processor of the first robotic refuse container determines the second robotic refuse container to replace the first robotic refuse container using a Markov Decision Process.

10. The method of claim 1, wherein processors of the at least two robotic refuse containers collaborate to generate a map of the environment.

11. The method of claim 1, wherein an application of a communication device is paired with at least one of the at least two robotic refuse containers and is configured to request for replacement of a particular robotic refuse container, request fill level of a particular robotic refuse container, request battery level of a particular robotic refuse container, and request a robotic refuse container at a particular location.

12. The method of claim 7, wherein:
   the processor of the first robotic refuse container uses at least a portion of the information in determining which robotic refuse container among all robotic refuse containers from which a return signal was received to transmit the confirmation of replacement to; and
   the processor of the first robotic refuse container assigns each information a different weight in importance.

* * * * *